US006833416B2

(12) United States Patent
Kinnan et al.

(10) Patent No.: US 6,833,416 B2
(45) Date of Patent: Dec. 21, 2004

(54) METHODS OF POLYMERIZING OLEFIN MONOMERS WITH MIXED CATALYST SYSTEMS

(75) Inventors: Michael Allen Kinnan, Charleston, WV (US); Fred David Ehrman, Houston, TX (US); Pradeep Pandurang Shirodkar, Kingwood, TX (US); Mark Bradley Davis, Hurricane, WV (US); Michele Lynn Grief-Rust, Beaumont, TX (US)

(73) Assignee: Univation Technologies, LLC, Houston, TX (US)

(*) Notice: Subject to any disclaimer, the term of this patent is extended or adjusted under 35 U.S.C. 154(b) by 0 days.

(21) Appl. No.: 10/788,631

(22) Filed: Feb. 27, 2004

(65) Prior Publication Data

US 2004/0186250 A1 Sep. 23, 2004

Related U.S. Application Data

(60) Provisional application No. 60/456,444, filed on Mar. 21, 2003.

(51) Int. Cl.⁷ ................................................ C08F 2/38
(52) U.S. Cl. ............................ 526/82; 526/86; 526/90; 526/104; 526/106; 526/113; 526/154
(58) Field of Search ........................... 526/82, 86, 90, 526/104, 106, 113, 154

(56) References Cited

U.S. PATENT DOCUMENTS 5,106,926 A    4/1992  Eisinger et al. ............... 526/88
5,391,657 A    2/1995  Song et al. .................... 526/74
5,442,019 A    8/1995  Agapiou et al. ............... 526/82
5,539,076 A    7/1996  Nowlin ..................... 526/348.1
5,672,665 A    9/1997  Agapiou et al. ............... 526/82
5,672,666 A    9/1997  Muhle et al. .................. 526/82
5,712,352 A    1/1998  Brant et al. ................... 526/68
5,747,612 A    5/1998  Agapiou et al. ............... 526/82
5,753,786 A    5/1998  Agapiou et al. ............... 526/82
5,763,543 A    6/1998  Muhle et al. .................. 526/68
6,022,933 A    2/2000  Wright et al. ................. 526/68
6,028,140 A    2/2000  Collina et al. ................ 525/53
6,284,849 B1 * 9/2001  Almquist et al. .............. 526/82

FOREIGN PATENT DOCUMENTS

JP    62232404 A    10/1987
JP    09095509 A     4/1997

* cited by examiner

Primary Examiner—William K. Cheung
(74) Attorney, Agent, or Firm—Kevin M. Faulkner

(57) ABSTRACT

A method of transitioning catalysts for polyolefin polymerization is provided. In one aspect, the process includes providing a polymerization reactor that includes a first catalyst system, contacting olefin monomers with the first catalyst system to form polyolefin in a first polymerization reaction and introducing a catalyst killer to the polymerization reactor in an amount sufficient to terminate the first polymerization reaction. The method further includes introducing a second catalyst system to the polymerization reactor in the presence of at least a portion of the catalyst killer, wherein the at least a portion of the catalyst killer is an amount sufficient to activate the second catalyst system and contacting olefin monomers with the second catalyst system to form polyolefin in a second polymerization reaction.

30 Claims, No Drawings

METHODS OF POLYMERIZING OLEFIN MONOMERS WITH MIXED CATALYST SYSTEMS

CROSS-REFERENCE TO RELATED APPLICATION

The present application is related to, and claims priority to, U.S. provisional patent application 60/456,444 filed Mar. 21, 2003.

BACKGROUND OF THE INVENTION

1. Field of the Invention

The present invention relates to a method of transitioning incompatible polymerization catalyst systems. More particularly, the present invention relates to a method of transitioning a first catalyst system for olefin polymerization to a second catalyst system for olefin polymerization.

2. Description of the Related Art

During the production of olefin polymers in a commercial reactor it is often necessary to transition from one type of catalyst system producing polymers having certain properties and characteristics to another catalyst system capable of producing polymers of different chemical and/or physical attributes. In the past, to accomplish an effective transition between incompatible catalysts, the first catalyzed olefin polymerization process was stopped by various techniques known in the art. The reactor was then emptied, recharged and a second catalyst was introduced into a reactor. Such catalyst conversions are time consuming and costly because of the need for a reactor shut-down for an extended period of time during transition.

Another method of transition included discontinuing the polymerization of the first catalyst system to stop polymerization and introducing a second catalyst system into the polymerization reactor. However, stopping the first catalyst system feed into the reactor does not immediately stop polymerization reactions occurring within the reactor, resulting in the production of off-spec product for extended durations. The production of the off-spec product is costly and time consuming.

There is a need, therefore for a new transitioning or polymerization process that requires less reactor down-time.

SUMMARY

Embodiments of the present invention generally include a method of polymerizing olefin monomers. In one aspect, the method includes polymerizing olefin monomers with a first catalyst system and then polymerizing olefin monomers with a second catalyst system. At least one specific embodiment of the described processes includes providing a polymerization reactor that includes a first catalyst system, contacting olefin monomers with the first catalyst system to form polyolefin in a first polymerization reaction and introducing a catalyst killer to the polymerization reactor in an amount sufficient to terminate the first polymerization reaction. The process further includes introducing a second catalyst system to the polymerization reactor in the presence of at least a portion of the catalyst killer, wherein the at least a portion of the catalyst killer is an amount sufficient to activate the second catalyst system and contacting olefin monomers with the second catalyst system to form polyolefin in a second polymerization reaction. In a specific embodiment, the catalyst killer comprises water.

At least one specific embodiment includes introducing water into the polymerization reactor at a rate sufficient to provide a first water concentration, the first water concentration being sufficient to terminate a polymerization reaction catalyzed by a first catalyst system, adjusting the first water concentration to a second water concentration, the second water concentration being an amount sufficient to activate the bimetallic catalyst system and introducing the bimetallic catalyst system to the polymerization reactor.

In at least one embodiment, the process includes contacting one or more olefin monomers with the first catalyst system to polymerize the one or more olefin monomers and form polyolefin, introducing water into the gas phase polymerization reactor to create a water concentration sufficient to terminate the first catalyst system, reducing the water concentration to a level sufficient to activate the second catalyst system, introducing an organometallic compound to the polymerization reactor in an amount sufficient to activate at least a portion of the second catalyst compound and then introducing the second catalyst system to the gas phase polymerization reactor.

DETAILED DESCRIPTION

The method of transitioning from a first catalyst system to a second catalyst system described herein requires minimal to no reactor downtime. During transitioning, the feed of the first catalyst system into the reactor is interrupted, and a catalyst killer, polymerization inhibitor or poison is introduced into the reactor to deactivate the first catalyst system. Once the first catalyst system is substantially deactivated, the second catalyst system is fed into the reactor and polymerization resumes. The catalyst killer is a compound or mixture of compounds that is capable of deactivating the first catalyst system and that is also capable of activating at least a portion of the second catalyst system. For the purposes of this patent specification, the term "catalyst killer" does not include the minor portion of similar compounds that may be present in the monomer or comonomer feed streams during normal polymerization conditions, such as internal olefins, for example. According to embodiments described herein, the transitioning time between the first catalyst system polymerization and the second catalyst system polymerization can be reduced by 24 to 48 hours in comparison to traditional systems that require up to several days to shut-down a reactor and replace the seedbed.

The first catalyst system is typically a chromium-based catalyst used to produce homo polyolefins or copolymers thereof in a gas, slurry or bulk phase polymerization process. The second catalyst system is preferably a bimetallic catalyst system also used to polymerize one or more monomers to produce polyolefins or copolymers thereof in the same gas, slurry or bulk phase polymerization reactor. For simplicity and ease of description, embodiments of the invention will be further described with reference to a gas phase polymerization process.

In a typical continuous gas fluidized bed polymerization process for the production of polymer from one or more monomers, a gaseous stream comprising the one or more monomers is passed through a fluidized bed reactor in the presence of a catalyst system under reactive conditions. A polymer product is withdrawn. Also withdrawn is a cycle gas stream, which is continuously circulated and usually cooled, and together with additional monomer sufficient to replace the monomer polymerized is returned to the reactor. Different catalyst systems are capable of producing different polymers having different mechanical and rheological properties.

To transition from the first catalyst system to the second catalyst system within the same reactor, the injection of the first catalyst system is interrupted. The catalyst killer is then fed to the reactor in the gas recycle stream, which is in fluid communication with the reactor. The amount of the catalyst killer and the length of time the catalyst killer is fed to the reactor should be sufficient to substantially deactivate the first catalyst system and thus, substantially prevent polymerization from occurring. The amount of catalyst killer is critical to successfully transition the reactor to the second catalyst system because the first catalyst system should be substantially deactivated and not capable of reactivating itself before introducing the second catalyst system to the reactor. Furthermore, it is desirable to have an excess of the catalyst killer in the reactor to help activate at least a portion of the second catalyst system. The amount of catalyst killer sufficient to terminate the first polymerization reaction is typically at least 30 percent more than the amount sufficient to activate the second catalyst system.

In one aspect, the catalyst killer is added in an amount based on the seedbed weight. Preferably, the catalyst killer is added in an amount of from 5 to 20 ppm, preferably of from 8 to 18 ppm, and more preferably of from 12 to 15 ppm based on the weight of the seedbed. However, in addition to the size of the seed bed, the amount of catalyst killer depends on the size of the reactor, the quantity of catalysts and cocatalysts in the reactor, and the type of catalysts and cocatalysts in the reactor.

Additional catalyst killer may always be added to the reactor if the catalyst killer is consumed during the termination of the polymerization to a level that is insufficient to activate at least a portion of the second catalyst system. If needed, the catalyst killer is added to maintain concentration of from 5 to 12 ppm of the seedbed prior to introduction of the second catalyst system.

Once the catalyst killer has been introduced into the reactor, a period of time of from 0 to 24 hours, or from 0 to 12 hours, preferably from 0 to 8 hours, and more preferably from 0 to 2 hours, passes before introducing the second catalyst system to the polymerization reactor. The length of time or delay usually depends on the size of the seedbed. This delay allows the catalyst killer to disperse throughout the seedbed and throughout any polymer product within the reactor to sufficiently terminate polymerization.

During this delay, the concentration of the catalyst killer can be controlled. If needed, the amount of the catalyst killer in the polymerization reactor can be controlled by introducing additional catalyst killer to increase concentration or by purging excess catalyst killer from the reactor to reduce concentration. For example, the excess catalyst killer can be purged from the reactor via flow purging or pressure purging at high temperatures. In another example, the amount of catalyst killer in the polymerization reactor can be reduced by introducing a scavenger to the reactor, such as an aluminum alkyl compound for example. The scavenger reduces the catalyst killer concentration in the reactor by reacting with the catalyst killer to produce compounds that may be easily purged or removed from the reactor. Exemplary aluminum alkyls include triethylaluminum (TEAL), trimethylaluminum (TMA), tri-isobutylaluminum (TIBAL) and tri-n-hexylaluminum (TNHAL) and the like.

This delay further allows time for any adjustment of monomer concentrations in the cycle gas, e.g., gas cycling through the reactor. A certain gas composition should be present in the reactor for a given catalyst to produce a given product of a certain density and melt index, which generally depends on how well a catalyst incorporates comonomer. Generally, the gas composition contains at least one monomer. Suitable monomers include alpha-olefin having from 2 to 20 carbon atoms, preferably 2–15 carbon atoms, for example, alpha-olefin of ethylene, propylene, butene-1, pentene-1, 4-methylpentene-1, hexene-1, octene-1, decene-1 and cyclic olefins such as styrene. Other monomers can include polar vinyl, dienes, norborene, acetylene and aldehyde monomers. Preferably, the gas composition contains ethylene and at least one alpha-olefin having 3 to 15 carbon atoms. The gas composition may also contain an amount of hydrogen to control the melt index of the polymer to be produced. In typical circumstances the gas composition may also contain an amount of a dew point increasing component with the balance of the gas composition made up of non-condensable inerts, for example, nitrogen.

Alternatively, the gases within the reactor may be substantially purged from the reactor using pressure purging or flow purging techniques that are well known in the art. For example, nitrogen gas may be introduced and cycled through the reactor system to substantially remove or dilute the reactant concentrations from the system as the bed remains fluidized. Thereafter, a new gas composition containing the one or more monomers, hydrogen gas, co-catalyst, activators, and combinations thereof for the second polymerization are introduced to the fluidized bed within the reactor under reactive conditions.

This change from a substantially nitrogen environment to a reactive environment is known as "building conditions" or a "condition build". During the condition build, additional catalyst killer may be added to achieve a concentration level to sufficiently activate the second catalyst system. Additional aluminum alkyls may also be added during the condition build to control to control static within the reactor, as described in U.S. Pat. No. 5,106,926, which is incorporated by reference herein.

Once satisfactory polymerization conditions are achieved, the second catalyst system is added to the reactor. The second catalyst system is preferably fed to the reactor at a rate sufficient to substantially reduce or eliminate sheeting on the reactor walls. For example, the second catalyst system may be introduced to the reactor at a rate of from 50 to 75% of the feed rate used at a full production rate.

Catalyst Killer

An exemplary catalyst killer includes one or more compounds selected from the group consisting of water, oxygen, alcohols, glycols, phenols, ethers, carbonyl compounds such as ketones, aldehydes, carboxylic acids, esters, fatty acids, alkynes such as acetylene, amines, nitrites, nitrous compounds, pyridine, pyroles, carbonylsulfide (COS), mercaptans, derivatives thereof, or any mixtures or combinations thereof. These compounds are commonly referred to as "irreversible" catalyst killers, which are those compounds that permanently inactivate a catalyst's ability to polymerize monomers. Contrastly, "reversible" catalyst killers are those compounds that initially inactivate a catalyst's ability to polymerize monomers for a period of time, but do not enduringly deactivate the catalyst.

Preferably, the catalyst killer includes water because water generally terminates the reaction in a shorter amount of time. Water also acts as an activator for at least a portion of the second catalyst system and therefore, does not require a separate purge step or any down time to purge from the reactor. Furthermore, water deactivates the active sites of the first catalyst. Water also deactivates any cocatalyst or aluminum alkyl, which may be used with the first catalyst. Water further reacts with any accumulated wall coating, which may have built up over many months or years, in the reaction system. The wall coating may be overly reactive or it could contain a metal oxide (for example, $Al_2O_3$), which acts as an adsorbent for water. Still further, water enhances the activation of the second catalyst system. Water also is absorbed into the seedbed although water is typically thought to have negligibly low solubility in polyethylene. Accordingly, these functions should be taken into account when determining the amount of water to be added.

The first and second catalyst systems may be compatible or incompatible, and may include chromium type catalysts, bimetallic catalysts, Ziegler-Natta type catalysts, and combinations thereof. The term "compatible catalysts", as used herein, includes two or more catalysts having similar kinetics of termination and insertion of monomer and comonomer(s) and/or that do not detrimentally interact with each other. The term "incompatible catalysts", as used herein, includes those that satisfy one or more of the following: 1) those catalysts that in each others presence reduce the activity of at least one of the catalysts by greater than 50%; 2) those catalysts such that under the same reactive conditions one of the catalysts produces polymers having a molecular weight greater than two times higher than any other catalyst in the system; and 3) those catalysts that differ in comonomer incorporation or reactivity ratio under the same conditions by more than about 30%. The terms "catalysts" and "catalyst systems" are used interchangeably herein.

First Catalyst System

Preferably, the first catalyst system includes one or more chromium-type catalysts. Chromium catalysts are well known in the art and include, for example $Cp_2Cr$, where Cp is a cyclopentadienyl ring, which can be substituted. Other chromium catalysts can include disubstituted chromates, such as $CrO_2(OR)_2$; where R is triphenylsilane or a tertiary polyalicyclic alkyl. The chromium catalyst system may further include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 2,285,721, 3,242,099 and 3,231,550, which are herein fully incorporated by reference.

In one aspect, the first catalyst system is a supported reaction product of one or more bis-hydrocarbylsilyl chromates and one or more hydrocarbylaluminum or hydrocarbylboron compounds, as described in U.S. Pat. No. 5,137,994, which is incorporated by reference herein. The bis-tryarylsilyl chromates and a method for their preparation are described in U.S. Pat. Nos. 3,324,095; 3,324,101 and 3,704,287, which are also incorporated by reference herein. Examples of bis-triarylsilyl chromates are bis-triphenylsilyl chromate; bis-tritolylsilyl chromate; bis-trixylylsilyl chromate; bis-trinaphthylsilyl chromate; bis-triethylphenylsilyl chromate; bis-trimethylnaphthylsilyl chromate; and bis-adamantyl chromate. According to these patents, the hydrocarbylaluminum compound is, on occasion, identified as a cocatalyst and, at other times, as a promoter or reducing agent when it is reacted with the chromate prior to carrying out the copolymerization.

Exemplary hydrocarbylaluminum compounds include trihydrocarbylaluminum compounds, hydrocarbylaluminum halides, hydrocarbylaluminum hydrocarbyloxides, and hydrocarbylaluminum hydrides. In these compounds, the hydrocarbyl group can contain from 1 to about 14 carbon atoms, and the halogen can be chlorine, bromine, fluorine, or iodine. The hydrocarbyl group can be an alkyl, aralkyl, aryl, alkaryl, alicyclic, or bicyclic group. Examples of the hydrocarbylaluminum compounds are trimethylaluminum, triethylaluminum, tributylaluminum, tridecylaluminum, tridodecylaluminum, diethylaluminum chloride, dibutylaluminum chloride, dibutylaluminum bromide, dibutylaluminum iodide, dibutylaluminum fluoride, dihexylaluminum chloride, methylaluminum dichloride, ethylaluminum dibromide, butylaluminum dichloride, pentylaluminum dichloride, diethylaluminum hydride, dibutylaluminum hydride, dihexylaluminum hydride, methylaluminum dihydride, ethylaluminum dihydride, butylaluminum dihydride, and pentylaluminum dihydride. They can be generically classified as compounds having the formula $R_nAlX_{3-n}$ wherein R is a hydrocarbyl group as defined above, X is a halogen, a hydrocarbyloxide, or a hydrogen and n is an integer from 1 to 3.

The hydrocarbylboron compounds that can be used in the practice of this invention are compounds of the general formula:

$$BR_3$$

wherein R is a hydrocarbyl group having 1 to 14 carbon atoms. Examples are trimethylborane, triethylborane, triisobutylborane, and tributylborane. Triethylborane is the preferred modifying agent of this class. The hydrocarbylaluminum hydrocarbyloxides, which are commonly termed "alkylaluminum alkoxides", are compounds of the general formula:

$$R_nAl(OR)_{3-n}$$

wherein n is an integer from 1 to 2, and R is a hydrocarbyl group having 1 to 14 carbon atoms, preferably 1 to 8 carbon atoms. The hydrocarbyl group can be alkyl, aralkyl, aryl, alkaryl, alicyclic, or bicyclic. Examples are methyl, ethyl, propyl, iso-propyl, n-butyl, iso-butyl, n-pentyl, iso-pentyl, t-pentyl, hexyl, cyclohexyl, 2-methy-pentyl, heptyl, octyl, 2-ethylhexyl, cyclohexylmethyl, nonyl, decyl undecyl, dodecyl, tridecyl, tetradecyl, benzyl, pinyl, pinylmethyl, phenethyl. p-methybenzyl, phenyl, tolyl, xylyl, naphthyl, ethylphenyl, methynaphthyl, dimethylnaphthyl, norborynyl, and norbornyl methyl. The most preferred hydrocarbylaluminum hydrocarbyloxide compound is diethylaluminumethoxide.

In all of the above instances, the hydrocarbyl groups, the halide groups, and the hydride groups are independently selected, i.e., these groups can be the same or different.

As noted above, the reaction product of the chromate and the hydrocarbylaluminum compound or hydrocarbyl boron compound is supported. While silica is the preferred support, other inorganic oxides can be used. Examples of useful support materials are aluminum phosphate, alumina, silica 1 alumina mixtures, silica modified with a hydrocarbylaluminum compound such as triethylaluminum, silica modified with diethylzinc, silica modified with a titanium tetrahydrocarbyloxide compound such as titanium tetraisopropoxide, silica/titania cogels, titanias and a mixture of silica and calcium carbonate. A typical support is a dehydrated, solid, particulate porous material essentially inert to the polymerization. It is used as a dry powder having an average particle size of about 2 to about 250 microns and preferably about 30 to about 180 microns; a surface area of about 100 to about 750 square meters per gram and preferably about 240 to about 550 square meters per gram; and a pore size of about 80 Angstroms to about 300 Angstroms and preferably about 120 to about 250 Angstroms.

The catalyst can be prepared by reacting the bis-triarylsilyl chromate, the hydrocarbylaluminum compound or hydrocarbyl boron compound, and a dehydrated support material together. The bis-triarylsilyl chromate reacts with hydroxyl groups, which are present on the surface of the support. Thus, the chromate is for the most part chemically adsorbed on the surface of the support. Any part of the chromate, which is not chemically adsorbed, is physically adsorbed on the surface of the support. Usually, about 50 to about 100 percent of the chromate is chemically adsorbed. It should be noted, however, that the chromate retains one or more reactive groups, which react with the hydrocarbyl aluminum or boron compound. The amount of support used is generally that which will provide about 0.01 to about 0.3 millimole of chromium per gram of support and preferably about 0.03 to about 0.1 millimole of chromium per gram of support.

Second Catalyst System

The second catalyst system may include a single catalyst composition, a bimetallic catalyst composition or a multi-catalyst composition. In one aspect, the second catalyst system is a bimetallic catalyst composition. As used herein, the terms "bimetallic catalyst composition" and "bimetallic catalyst" include any composition, mixture or system that includes at least two different catalyst components, preferably each having a different metal group. For example, each different catalyst component can reside on a single support particle, so that the bimetallic catalyst is a supported bimetallic catalyst. The term bimetallic catalyst also includes a system or mixture in which one of the catalysts (e.g., the first catalyst compound) resides on one collection of support particles, and another catalyst (e.g., the second catalyst compound) resides on another collection of support particles. The two supported catalyst component are introduced to a single reactor, either simultaneously or sequentially.

Various methods can be used to affix two different catalyst components to a support, to form a bimetallic catalyst (also referred to as a "mixed catalyst"). For example, one procedure for preparing a supported bimetallic catalyst can include providing a supported first catalyst component, contacting a slurry including the first catalyst component and a non-polar hydrocarbon with a mixture (solution or slurry) that includes the second catalyst component, which may also include an activator. The procedure may further include drying the resulting product that includes the first and second catalyst components and recovering a bimetallic catalyst composition.

First Catalyst Component

In one aspect, the first catalyst component is (or includes) a non-metallocene compound. However, it is contemplated that for certain applications the first catalyst component may alternatively be a Ziegler-Natta type catalyst, a metallocene compound, or even one of the bulky ligand metallocene-type catalyst compounds identified below. However, in at least certain embodiments, the first catalyst component is not a fluorinated catalyst, unlike the second catalyst component.

In one aspect, suitable non-metallocene transition metal compounds include compounds of Group 4 and 5 metals that are soluble in the non-polar hydrocarbon used to form the silica slurry. Suitable non-metallocene transition metal compounds include, for example, titanium and vanadium halides, oxyhalides or alkoxyhalides, such as titanium tetrachloride ($TiCl_4$), vanadium tetrachloride ($VCl_4$) and vanadium oxytrichloride ($VOCl_3$), and titanium and vanadium alkoxides, wherein the alkoxide moiety has a branched or unbranched alkyl group of 1 to 20 carbon atoms, preferably 1 to 6 carbon atoms. Mixtures of such transition metal compounds may also be used.

In another aspect, a conventional Ziegler-Natta catalyst contacted with a "modifier" (described below) to form an unactivated modified Ziegler-Natta catalyst may be used. When used herein to describe a catalyst, the term "unactivated" is to be given its broadest definition or usage that is reflected in previously issued U.S. patents. The term "unactivated' means "not activated," "not active," or "inactive," preferably such that the catalyst is not (without further treatment or modification) capable of promoting polymerization when combined with monomers under polymerization conditions in a reactor. Preferably, an "unactivated" catalyst is one having either no activity; or an activity of less than 10 grams polymer per gram of catalyst. Alternatively, in at least certain embodiments, an "unactivated" catalyst is one having an activity of less than 100 grams polymer per gram of catalyst; and in other embodiments, an unactivated catalyst is one having an activity of less than 500 grams polymer per gram of catalyst. Those skilled in the art will recognize, as reflected in numerous prior art patents, that a catalyst must be "activated" in some way before it is useful for promoting polymerization. As discussed below, activation is typically done by combining the catalyst compound (e.g., a Ziegler-Natta compound) with an "activator," which is also referred to sometimes as a "co-catalyst." Although the methods described herein also include various activation steps, e.g., combining a catalyst with an activator such as TMA, those activation steps are not to be confused with catalyst "modification." Whereas the former results in an activated catalyst, the latter does not result in an activated catalyst, even though the modifiers described herein have been used as co-catalysts or activators in other situations.

The "modifier" recited herein is defined broadly as any compound that includes at least a Group 13 metal and an alkyl group, i.e., one or more alkyl groups. Preferably the modifier also includes a halogen group. Preferably, the Group 13 metal is aluminum although boron is also encompassed. Preferably the alkyl group is either ethyl or butyl. Preferably, the halogen group is chlorine. Thus, for example, a preferred modifier is diethyl aluminum chloride (DEAC). Another modifier is ethylaluminum sesquichloride (EASC). Another modifier, which does not include a halogen group, is diethylaluminum ethoxide (DEAL-E).

Nonlimiting examples of modifiers that contain a Group 13 metal include: methylaluminum dichloride, ethylaluminum dichloride, isobutylaluminum dichloride, n-octylaluminum dichloride, methylaluminum sesquichloride, ethylaluminum sesquichloride, ethylaluminum sesquibromide, isobutylaluminum sesquichloride, dimethylaluminum chloride, diethylaluminum chloride, diethylaluminum bromide, diethylaluminum iodide, di-n-propylaluminum chloride, di-n-butylaluminum chloride, diisobutylaluminum chloride, di-n-octylaluminum chloride, diethyaluminum ethoxide, diisobutylaluminum ethoxide, bis (diisobutylaluminum) oxide, diethylboron methoxide, dimethylboron chloride, diethylboron chloride, di-n-butylboron chloride and di-iso-butylboron chloride In at least certain embodiments, the amount of modifier that is used to modify the first catalyst compound can be critical. At the very least, an effective amount should be used, meaning an amount that provides a productivity greater than the productivity of the Ziegler-Natta catalyst (or the bimetallic catalyst) without the modifier, when the modified catalyst is subsequently treated with an activator, and when that activated modified catalyst is combined with monomers in a polymerization reaction.

Preferably, the molar ratio of the Group 13 metal to the transition metal (in the Ziegler-Natta catalyst) should be less than 10:1. It is contemplated that amounts of modifier represented by a molar ratio of 10:1 or above may cause activation of the catalyst to occur, which is undesirable. A catalyst that becomes activated cannot be stored for any appreciable period of time without suffering from degradation. For example, an activated catalyst may begin to degrade after only 1 week of storage. In certain embodiments of the method, the molar ratios of the Group 13 metal in the modifier to the transition metal in the Ziegler-Natta catalyst fall within certain ranges, e.g., having upper limits of 7:1; or 5:1; or 4:1; or 3:1; or even 2:1; and lower limits of 0.01:1, or 0.1:1 or 1:1, wherein the ranges can extend from any of the foregoing lower limits to any of the foregoing upper limits. When the support modifier includes chlorine, it is preferable that the level of modifier should have a molar ratio of 5:1 or less because of the corrosivity of chlorine.

Further, in at least certain embodiments of the methods, the sequence the modifier and/or activator contacts the catalyst is important to obtain improved productivity. Specifically, for example, as demonstrated in the examples below, first contacting a modifier with an unactivated Ziegler-Natta catalyst, and then subsequently contacting the modified unactivated Ziegler-Natta with an activator provides an activated modified Ziegler-Natta catalyst with higher productivity than if the modifier and activator are contacted with the Ziegler-Natta catalyst at the same time. Accordingly, the former is preferred over the latter.

In a preferred embodiment of the method, the unactivated modified Ziegler-Natta catalyst is supported, e.g., affixed to a support such as silica. That unactivated modified supported Ziegler-Natta catalyst is then preferably combined with the bulky ligand metallocene type catalyst compound described below (which may be activated, e.g., already combined with an activator) to form the bimetallic catalyst composition. Preferably, an effective amount of the "first activator," i.e., the activator that is capable of activating the modified Ziegler-Natta catalyst (e.g., TMA), is contacted with the bimetallic catalyst composition to then provide an activated modified Ziegler-Natta catalyst.

A specific embodiment of the method involves contacting a support material with an organomagnesium compound that includes at least one alkyl group to form a supported organomagnesium compound; then contacting the supported organomagnesium compound with a transition metal compound to form an unactivated Ziegler-Natta catalyst that includes titanium; then contacting the unactivated Ziegler-Natta catalyst with an effective amount of a modifier that includes diethylaluminum chloride (DEAC) or ethylaluminum sesquichloride (EASC) or diethylealuminum ethoxide (DEAL-E) to form a unactivated modified Ziegler-Natta catalyst.

A specific embodiment of the method also involves affixing the first catalyst component to a support prior to modification of the first catalyst component. The support material is first mixed with a non-polar hydrocarbon solvent to form a support slurry. The support slurry is then contacted with an organomagnesium compound, which preferably dissolves in the non-polar hydrocarbon of the support slurry to form a solution from which the organomagnesium compound is deposited onto the support material, or "carrier". The support slurry including the organomagnesium compound and the organic alcohol can then be contacted with the non-metallocene transition metal compound to form the Ziegler-Natta catalyst.

The organomagnesium compound can be represented by the formula RMgR', where R' and R are the same or different $C_2$–$C_{12}$ alkyl groups, or $C_4$–$C_{10}$ alkyl groups, or $C_4$–$C_8$ alkyl groups. In at least one specific embodiment, the organomagnesium compound is dibutyl magnesium.

Preferably, the amount of organomagnesium compound included in the support slurry is only that which will be deposited, physically or chemically, onto the support, e.g., being affixed to the hydroxyl groups on the support, and no more than that amount, since any excess organomagnesium compound may cause undesirable side reactions during later polymerizations. Routine experimentation can be used to determine the optimum amount of organomagnesium compound in the support slurry. For example, the organomagnesium compound can be added to the slurry while stirring the slurry, until the organomagnesium compound is detected in the support solvent. Alternatively, the organomagnesium compound can be added in excess of the amount that is deposited onto the support, in which case any undeposited excess amount can be removed by filtration and washing. The amount of organomagnesium compound (in moles) based on the amount of dehydrated silica (in grams) should generally range from 0.2 mmol/g to 2.0 mmol/g.

Optionally, the support slurry including the organomagnesium compound is contacted with an electron donor, such as tetraethylorthosilicate (TEOS) or an organic alcohol having the formula R"OH, where R" is a $C_1$–$C_{12}$ alkyl group, or a $C_1$ to $C_8$ alkyl group, or a $C_2$ to $C_4$ alkyl group. In a particular embodiment, R"OH is n-butanol. The amount of organic alcohol is preferably used in an amount effective to provide an R"OH:Mg mol/mol ratio of from 0.2 to 1.5, or from 0.4 to 1.2, or from 0.6 to 1.1, or from 0.9 to 1.0.

Second Catalyst Component

The second catalyst component preferably is (or includes) a bulky ligand metallocene-type catalyst compound, which in a preferred embodiment is represented by the formula (I) $Cp_2MR_2X_2$ wherein Cp is a substituted or unsubstituted cyclopentadienyl ring or derivative thereof, M is a Group 4, 5, or 6 transition metal; R is a hydrocarbyl group or hydrocarboxy group having from one to twenty carbon atoms, and X is a halogen, preferably fluorine.

More broadly, the bulky ligand metallocene-type catalyst compound can be any bulky ligand metallocene-type catalyst compound. Generally, the bulky ligand metallocene-type catalyst compounds referenced herein include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. For the purposes of this patent specification and appended claims the term "leaving group" is any ligand that can be abstracted from a bulky ligand metallocene-type catalyst compound to form a bulky ligand metallocene-type catalyst cation capable of polymerizing one or more olefins.

The bulky ligands are generally represented by one or more open or fused ring(s) or ring system(s) or a combination thereof. These ring(s) or ring system(s) are typically composed of atoms selected from Groups 13 to 16 atoms, preferably the atoms are selected from the group consisting of carbon, nitrogen, oxygen, silicon, sulfur, phosphorous, boron and aluminum or a combination thereof. Most preferably the ring(s) or ring system(s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 16 and the lanthanide or actinide series of the Periodic Table of Elements. Preferably the metal is a transition metal from Groups 4 through 12, more preferably 4, 5 and 6, and most preferably the metal is from Group 4.

In one embodiment, the bulky ligand metallocene-type catalyst compounds of the invention are represented by the formula:

$$L^A L^B M Q_n \qquad (II)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium.

The bulky ligands, $L^A$ and $L^B$, are open or fused ring(s) or ring system(s) such as unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, indenyl ligands, benzindenyl ligands, fluorenyl ligands, octahydrofluorenyl ligands, cyclooctatetraendiyl ligands, azenyl ligands, azulene ligands, pentalene ligands, phosphoyl ligands, pyroyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-5 bonding to M. In another embodiment, $L^A$ and $L^B$ may comprise one or more heteroatoms, for example, nitrogen, silicon, boron, germanium, sulfur and phosphorous, in combination with carbon atoms to form an open, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment in formula (II) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched, cyclic alkyl radicals, or alkenyl, alkynl or aryl radicals, or combination thereof. In a preferred embodiment, substituent groups R have up to 50 non-hydrogen atoms, preferably from 1 to 30 carbon atoms that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that formula (I) above represents a neutral bulky ligand metallocene-type catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In a preferred embodiment, at least one Q, or the leaving group in the above formula (II) is a fluoride leaving group (F) or a fluorine containing ligand. Examples of fluorine containing ligands include those represented by the formula: $FR^1$, where $R^1$ is alkyl, alkoxide, alkylaryl or unsaturated hydrocarbon or an R as defined above for formula (I). Non-limiting examples of fluorine containing ligands include fluoroalkyl, fluoroaryls, fluoroalkoxides and fluoroalkylaryls, for example, trifluoromethyl, trifluoroethyl, pentafluorophenyl, monofluorovinyl, and the like or combinations thereof. In the most preferred embodiment of the invention, the bulky ligand metallocene-type catalyst compounds or organometallic catalysts of the invention have at least one leaving group that is fluoride (F), preferably all the leaving groups are fluorides (F).

In one embodiment, the bulky ligand metallocene-type catalyst compounds of the invention include those of formula I where $L^A$ and $L^B$ are bridged to each other by a bridging group, A. These bridged compounds are known as bridged, bulky ligand metallocene-type catalyst compounds. Non-limiting examples of bridging group A include bridging groups containing at least one Group 13 to 16 atom, often referred to a divalent moiety such as but not limited to at least one of a carbon, oxygen, nitrogen, silicon, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens.

In another embodiment, the bulky ligand metallocene-type catalyst compound of the invention is represented by the formula:

$$(C_5H_{4-d}R_d)A_x(C_5H_{4-d}R_d)M\,Qg_{-2} \qquad (III)$$

where M is a Group 4, 5, 6 transition metal, $(C_5H_{4-d}R_d)$ is an unsubstituted or substituted, cyclopentadienyl ligand or cyclopentadienyl-type bulky ligand bonded to M, each R, which can be the same or different, is hydrogen or a substituent group containing up to 50 non-hydrogen atoms or substituted or unsubstituted hydrocarbyl having from 1 to 30 carbon atoms or combinations thereof, or two or more carbon atoms are joined together to form a part of a substituted or unsubstituted ring or ring system having 4 to 30 carbon atoms, A is one or more of, or a combination of, carbon, germanium, boron, silicon, tin, phosphorous or nitrogen atom containing radical bridging two $(C_5H_{4-d}R_d)$ rings; more particularly, non-limiting examples of bridging group A may be represented by $R'_2C$, $R'_2Si$, $R'_2Si\ R'_2Si$, $R'_2SiOSi\ R'_2$, $R'_2Si\ R'_2C$, $R'_2Ge$, $R'_2Si\ R'_2Ge$, $R'_2GeR'_2C$, R'N, R'P, $R'_2C$ R'N, $R'_2C$ R'P, $R'_2Si$ R'N, $R'_2Si$ R'P, $R'_2GeR'N$, $R'_2Ge$ R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system; and independently, each Q can be the same or different is a hydride, substituted or unsubstituted, linear, cyclic or branched, hydrocarbyl having from 1 to 30 carbon atoms, halogen, alkoxides, aryloxides, amides, phosphides, or any other univalent anionic ligand or combination thereof; also, two Q's together may form an alkylidene ligand or cyclometallated hydrocarbyl ligand or other divalent anionic chelating ligand, where g is an integer corresponding to the formal oxidation state of M, and d is an integer selected from 0, 1, 2, 3 or 4 and denoting the degree of substitution, x is an integer from 0 to 1; and at least one Q is fluoride (F) or a fluorine containing ligand. In the above formulas (II) and (III), in an embodiment, the formulas exclude the compound bis(pentamethylcyclopentadienyl) zirconium difluoride.

In one embodiment, the bulky ligand metallocene-type catalyst compounds are those where the R substituents on the bulky ligands $L^A$, $L^B$, $(C_5H_{4-d}R_d)$ of formulas (II) and (III) are substituted with the same or different number of substituents on each of the bulky ligands. In another embodiment, the bulky ligands $L^A$, $L^B$, $(C_5H_{4-d}R_d)$ of formulas (II) and (III) are different from each other.

Other bulky ligand metallocene-type catalysts compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO96/00244 and WO 97/15602 and U.S. Pat. Nos. 5,057,475, 5,096,867, 5,055,438, 5,198, 401, 5,227,440 and 5,264,405 and European publication EP-A-0 420 436, all of which are herein fully incorporated by reference. Other bulky ligand metallocene-type catalyst compounds and catalyst systems useful in the invention may include those described in U.S. Pat. Nos. 5,064,802, 5,145, 819, 5,149,819, 5,243,001, 5,239,022, 5,276,208, 5,296,434, 5,321,106, 5,329,031, 5,304,614, 5,677,401, 5,723,398 and 5,753,578 and PCT publications WO 93/08221, WO 93/08199, WO 95/07140, WO 98/11144 and European publications EP-A-0 578 838, EP-A-0 638 595, EP-B-0 513 380, EP-A1-0 816 372, EP-A2-0 839 834 and EP-B1-0 632 819, all of which are herein fully incorporated by reference.

In another embodiment, the bulky ligand metallocene-type catalyst compound is represented by the formula:

$$L^C A J M Q_n \qquad (IV)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand at least one of which is fluoride (F) or a fluorine containing ligand; and n is the integer 0,1 or 2. In formula (IV) above, $L^C$, A and J form a fused ring system. In an embodiment, $L^C$ of formula (IV) is as defined above for $L^A$ in formula (II), and A, M and Q of formula (IV) are as defined above in formula (II).

In another embodiment, the bulky ligand metallocene-type catalyst compound useful in the invention is represented by the formula:

$$(C_5H_{5-y-x}R_x)(A_y)(JR'_{z-1-y})M(Q)_n(L')_w \qquad (V)$$

where M is a transition metal from Group 4 in any oxidation state, preferably, titanium, zirconium or hafnium, most preferably titanium in either a +2, +3 or +4 oxidation state. A combination of compounds represented by formula (V) with the transition metal in different oxidation states is also contemplated. $L^C$ is represented by $(C_5H_{5-y-x}R_x)$ and is a bulky ligand as described above. More particularly $(C_5H_{5-y-x}R_x)$ is a cyclopentadienyl ring or cyclopentadienyl-type ring or ring system that is substituted with from 0 to 5 substituent groups R, and "x" is 0, 1, 2, 3 or 4 denoting the degree of substitution. Each R is, independently, a radical selected from a group consisting of 1 to 30 non-hydrogen atoms. More particularly, R is a hydrocarbyl radical or a substituted hydrocarbyl radical having from 1 to 30 carbon atoms, or a hydrocarbyl-substituted metalloid radical where the metalloid is a Group 14 or 15 element, preferably silicon or nitrogen or a combination thereof, and halogen radicals and mixtures thereof. Substituent R groups also include silyl, germyl, amine, and hydrocarbyloxy groups and mixtures thereof. Also, in another embodiment, $(C_5H_{5-y-x}R_x)$ is a cyclopentadienyl ligand in which two R groups, preferably two adjacent R groups are joined to form a ring or ring system having from 3 to 50 atoms, preferably from 3 to 30 carbon atoms. This ring system may form a saturated or unsaturated polycyclic cyclopentadienyl-type ligand such as those bulky ligands described above, for example, indenyl, tetrahydroindenyl, fluorenyl or octahydrofluorenyl.

The $(JR'_{z-1-y})$ of formula (V) is a heteroatom containing ligand in which J is an element with a coordination number of three from Group 15 or an element with a coordination number of two from Group 16 of the Periodic Table of Elements. Preferably J is a nitrogen, phosphorus, oxygen or sulfur atom with nitrogen being most preferred. Each R' is, independently, a radical selected from the group consisting of hydrocarbyl radicals having from 1 to 20 carbon atoms, or as defined for R in formula (II) above. The "y" is 0 or 1, and the "z" is the coordination number of the element J. In one embodiment, in formula (V), the J of formula (IV) is represented by $(JR'_{z-1-y})$.

In formula (V) each Q is, independently, any univalent anionic ligand such as halogen, hydride, or substituted or unsubstituted hydrocarbyl having from 1 to 30 carbon atoms, alkoxide, aryloxide, sulfide, silyl, amide or phosphide. Q may also include hydrocarbyl groups having ethylenic unsaturation thereby forming a $\eta^3$ bond to M. Also, two Q's may be an alkylidene, a cyclometallated hydrocarbyl or any other divalent anionic chelating ligand. The integer n may be 0, 1, 2 or 3; and at least one Q is a fluoride (F) or a fluorine containing ligand.

The A of formula (V) is a covalent bridging group containing a Group 13 to 16 element, preferably a Group 14 and 15 element, most preferably a Group 14 element.

Non-limiting examples of bridging group A include a dialkyl, alkylaryl or diaryl silicon or germanium radical, alkyl or aryl phosphine or amine radical, or a hydrocarbyl radical such as methylene, ethylene and the like.

Optionally associated with formula (V) is L', a Lewis base such as diethylether, tetraethylammonium chloride, tetrahydrofuran, dimethylaniline, aniline, trimethylphosphine, n-butylamine, and the like; and w is a number from 0 to 3. Additionally, L' may be bonded to any of R, R' or Q and n is 0, 1, 2 or 3.

In another embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene-type catalyst compound is represented by the formula:

$$L^D MQ_2(YZ)A_n \qquad (VI)$$

where M is a Group 3 to 16 metal, preferably a Group 4 to 12 transition metal, and most preferably a Group 4, 5 or 6 transition metal; $L^D$ is a substituted or unsubstituted bulky ligand that is bonded to M; each Q is independently bonded to M and $Q_2(YZ)$ forms a unicharged polydentate ligand; A is a univalent anionic ligand also bonded to M; n is 1 or 2; and at least one of A or Q is fluoride (F) or a fluorine containing ligand.

In another embodiment, M is a Group 4, 5 or 6 transition metal, preferably from Group 4, more preferably titanium, zirconium and hafnium, and most preferably zirconium; $L^D$ is selected from the group of bulky ligands consisting of cyclopentadienyl, indenyl, tetrahydroindenyl, benzindenyl, fluorenyl, octahydrofluorenyl, cyclooctatetraendiyl and including those bulky ligands described above for $L^A$ of formula (II); Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; A is a univalent anionic group when n is 2 or A is a divalent anionic group when n is 1; preferably A is a carbamate, carboxylate, or other heteroallyl moiety described by the Q, Y and Z combination. In another embodiment of formula (VI), optionally, $T_m$ is a bridging group bonded to $L^D$ and another $L^D$ of another $L^D MQ_2 YZA_n$ compound, where m is an integer from 2 to 7, preferably 2 to 6, most preferably 2 or 3; and T is selected from the group consisting of alkylene and arylene groups containing from 1 to 10 carbon atoms optionally substituted with carbon or heteroatom(s), germanium, silicon and alkyl phosphine.

In another embodiment, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum silicon, phosphorous and tin. Examples of these bulky ligand metallocene-type catalyst compounds are described in WO 96/33202, WO 96/34021, WO 97/17379 and WO 98/22486 and U.S. Pat. Nos. 5,637,660, 5,539,124, 5,554,775, 5,756,611, 5,233,049 and 5,744,417, all of which are herein incorporated by reference.

In another embodiment, the bulky ligand metallocene-type catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference.

In one embodiment, the bulky ligand metallocene-type catalyst compound is represented by the formula:

$$((Z)XA_t(YJ))_q MQ_n \qquad (VII)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

In another embodiment, these metallocene-type catalyst compounds are represented by the formula:

$$((R'_m Z)XA_t(YJR''_m))_q MQ_n \qquad (VIII)$$

where M is a metal selected from Group 3 to 13 of the Periodic Table of Elements, preferably a Group 4 to 12 transition metal, more preferably a Group 4, 5 or 6 transition metal, even more preferably a Group 4 transition metal such as titanium, zirconium or hafnium, and most preferably zirconium;

Each Q is bonded to M and each Q is a monovalent, bivalent, or trivalent anion. Preferably each Q is independently selected from the group consisting of halogens, hydrogen, alkyl, aryl, alkenyl, alkylaryl, arylalkyl, hydrocarboxy or phenoxy radicals having 1–20 carbon atoms. Each Q may also be amides, phosphides, sulfides, silylalkyls, diketonates, and carboxylates. Optionally, each Q may contain one or more heteroatoms, more preferably each Q is selected from the group consisting of halides, alkyl radicals and arylalkyl radicals. Most preferably, each Q is selected from the group consisting of arylalkyl radicals such as benzyl.

X and Y are preferably each heteroatoms, more preferably independently selected from the group consisting of nitrogen, oxygen, sulfur and phosphorous, even more preferably nitrogen or phosphorous, and most preferably nitrogen;

Y is contained in a heterocyclic ring or ring system J. J contains from 2 to 30 carbon atoms, preferably from 2 to 7 carbon atoms, more preferably from 3 to 6 carbon atoms, and most preferably 5 carbon atoms. Optionally, the heterocyclic ring J containing Y, may contain additional heteroatoms. J may be substituted with R" groups that are independently selected from the group consisting of hydrogen or linear, branched, cyclic, alkyl radicals, or alkenyl, alkynl, alkoxy, aryl or aryloxy radicals. Also, two or more R" groups may be joined to form a cyclic moiety such as an aliphatic or aromatic ring. Preferably R" is hydrogen or an aryl group, most preferably R" is hydrogen. When R" is an aryl group and Y is nitrogen, a quinoline group is formed. Optionally, an R" may be joined to A; Z is a hydrocarbyl group bonded to X, preferably Z is a hydrocarbyl group of from 1 to 50 carbon atoms, preferably Z is a cyclic group having from 3 to 30 carbon atoms, preferably Z is a substituted or unsubstituted cyclic group containing from 3 to 30 carbon atoms, optionally including one or more heteroatoms, more preferably Z is an aryl group, most preferably a substituted aryl group; Z may be substituted with R' groups that are independently selected from group consisting of hydrogen or linear, branched, alkyl radicals or cyclic alkyl, alkenyl, alkynl or aryl radicals. Also, two or more R' groups may be joined to form a cyclic moiety such as an aliphatic or aromatic ring. Preferably R' is an alkyl group having from 1 to 20 carbon atoms, more preferably R' is methyl, ethyl, propyl, butyl, pentyl and the like, including isomers thereof, more preferably R' is a secondary or tertiary hydrocarbon, including isopropyl, t-butyl and the like, most preferably R' is an isopropyl group. Optionally, an R' group may be joined to A. It is preferred that at least one R' is ortho to X; When t is 1, A is a bridging group joined to at least one of, preferably both of, X and J. Bridging group A contains one or more Group 13 to 16 elements from Periodic Table of Elements. More preferably A contains one or more Group 14 elements, most preferably A is a substituted carbon group, a di-substituted carbon group or vinyl group; and in formula (VIII) m is independently an integer from 0 to 5, preferably 2; n is an integer from 1 to 4 and typically depends on the oxidation state of M; and q is 1 or 2, and where q is 2, the two (($R'_m$Z)XA(YJR"$_m$)) of formula (VIII) are bridged to each other via a bridging group, preferably a bridging group containing a Group 14 element. Also, in a preferred embodiment, the compound represented by formula (VII) or (VIII) may be contacted with acetone.

It is within the scope of this invention, in one embodiment, that the bulky ligand metallocene-type catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene-type catalyst are those diimine based ligands of Group 8 to 10 metal compounds disclosed in PCT publications WO 96/23010 and WO 97/48735 and Gibson, et. al., Chem. Comm., pp. 849–850 (1998), all of which are herein incorporated by reference.

Other bulky ligand metallocene-type catalysts are those Group 5 and 6 metal imido complexes described in EP-A2-0 816 384, which is incorporated herein by reference. In addition, bulky ligand metallocene-type catalysts include bridged bis(arylamido) Group 4 compounds described by D. H. McConville, et al., in Organometallics 1195, 14, 5478–5480, which is herein incorporated by reference.

It is also contemplated that in one embodiment, the bulky ligand metallocene-type catalysts of the invention described above include their structural or optical or enantiomeric isomers (meso and racemic isomers) and mixtures thereof.

Activators and Activation

In certain embodiments, either or both of the catalyst components may be contacted with a catalyst activator, herein simply referred to as an "activator." Depending on the type of catalyst, the catalyst activator is either a "first activator" or a "second activator." Alternatively, when contacting the bimetallic catalyst, e.g., the Ziegler-Natta catalyst and the bulky ligand metallocene type catalyst, the catalyst activator may be an activator composition that is a mixture of the "first activator" and the "second activator." Preferably, activators (particularly the first activator) are present in the polymerization reactor together with the bimetallic catalyst only when the monomers are also present, and polymerization is to be initiated, often once the activator and bimetallic catalyst are combined, the catalyst becomes activated, and is accordingly subject to degradation. As discussed above, an activator, preferably a "first activator" is preferably contacted or otherwise combined with the first catalyst after the first catalyst is modified.

The first activator can be any one or a combination of materials commonly employed to activate non-metallocene catalysts, including metal alkyls, hydrides, alkylhydrides, alkylhalides (such as alkyllithium compounds), dialkylzinc compounds, trialkylboron compounds, trialkylaluminum compounds, alkylaluminum halides and hydrides, and tetraalkylgermanium compounds. Preferably, the first activator is trimethyl aluminum (TMA). The amount of TMA is preferably sufficient to give a molar ratio of TMA to the metal in the Ziegler-Natta catalyst of about 10:1 to about 1000:1, preferably about 15:1 to about 300:1, and most preferably about 20:1 to about 100:1.

The second activator suitable for activating the metal sites in the second catalyst component, e.g., the bulky ligand metallocene type catalyst, is different from the first activator described above. The second activator is preferably a linear and/or cyclic aluminoxane species prepared from the interaction of $R_3Al$ and water, where R is a $C_1$–$C_{12}$ linear, branched or cyclic alkyl, with the amount of water controlling the average molecular weight of the aluminoxane molecule. Preferably, the second activator is methylaluminoxane (MAO).

The bimetallic catalyst, e.g., the enhanced support including the Ziegler-Natta catalyst and the bulky ligand metallocene type catalyst, may be contacted with the catalyst activator in a number of ways. Preferably, the supported bimetallic catalyst is contacted with a mixture including at least the first and second activators.

Supports

In certain embodiments, an unsupported version of the bimetallic catalyst described herein can be used in a polymerization process, i.e., in which the monomers are contacted with a bimetallic catalyst that is not supported. In other embodiments, a supported bimetallic catalyst can be used.

Typically, supporting a bimetallic catalyst includes preparing the support and then treating that support (e.g., combined with ingredients that form the first catalyst) to provide a supported catalyst that includes the first catalyst component. That supported first catalyst is then treated in the presence of the second catalyst component to provide a supported bimetallic catalyst.

In one aspect, the support is prepared by heating support particles at a dehydration temperature of up to 600° C., or to 800° C. or more when preparing an "enhanced support," resulting in a support having a modified chemical structure, e.g., a reduced number of hydroxyl groups. The higher dehydration temperatures are preferred. In preferred embodiments, increased productivity is achieved when the enhanced support is combined with the other parts of the bimetallic catalyst discussed herein, to form a supported bimetallic catalyst, which is then contacted with monomers during polymerization to produce a bimodal polyolefin composition.

The term "support," discussed herein, also refers to interchangeably as a carrier or supports (plural), refers to any solid, particulate, porous material to which the bimetallic catalysts described herein can be affixed or otherwise reside. The support is preferably an inorganic material such as silicon oxide (silica) or aluminum oxide. The support material can be a dry powder, and in certain embodiments has an average particle size of from 1–500 microns, or more narrowly from 10–250 microns. The surface area of the support may range from 3 $m^2/g$ to 600 $m^2/g$ or more.

A preferred support is an amorphous high surface area silica, such as Davison 952 or Sylopol® 955, sold by Davison Chemical Division of W.R. Grace and Company. Those silicas are in spherical form, prepared by a spray drying process, with a surface area of about 300 $m^2/g$ and a pore volume of about 1.65 $cm^3/g$. A procedure for dehydrating the silica at 600° C. or more is set forth in U.S. Pat. No. 5,525,678, and the disclosure in that patent relating to dehydration of supports is incorporated herein by reference.

The dehydrated support can then be combined with a non-polar hydrocarbon to form a support slurry, which can be stirred and optionally heated during mixing. A variety of non-polar hydrocarbons can be used to form the support slurry, but any non-polar hydrocarbon selected should remain in liquid form at all relevant reaction temperatures, and the ingredients used to form the first catalyst component should be at least partially soluble in the non-polar hydrocarbon. Accordingly, the non-polar hydrocarbon is considered to be a "solvent" herein, even though in certain embodiments the ingredients are only partially soluble in the hydrocarbon. For example, the organomagnesium compound, alcohol and transition metal compound of the first catalyst compound, described above, should be at least partially soluble, and preferably completely soluble, in that hydrocarbon solvent at the mixing temperatures described above.

Examples of suitable non-polar hydrocarbons include $C_4$–$C_{10}$ linear or branched alkanes, cycloalkanes and aromatics. More specifically, a non-polar alkane can be isopentane, hexane, isohexane, n-heptane, octane, nonane, or decane; a non-polar cycloalkane such as cyclohexane; or an aromatic such as benzene, toluene, or ethylbenzene. Mixtures of different non-polar hydrocarbons can also be used.

Once the support is treated and the slurry is prepared, the catalyst components are then added to the support. For illustrative purposes, a specific embodiment will now be described. In this specific embodiment, the slurry is first contacted with an organomagnesium compound, which preferably then dissolves in the non-polar hydrocarbon of the slurry to form a solution from which the organomagnesium compound is then deposited onto the carrier. The organomagnesium compound can be represented by the formula RMgR', where R' and R are the same or different $C_2$–$C_{12}$ alkyl groups, or $C_4$–$C_{10}$ alkyl groups, or $C_4$–$C_8$ alkyl groups. In at least one specific embodiment, the organomagnesium compound is dibutyl magnesium. Preferably, the amount of organomagnesium compound included in the silica slurry is only that which will be deposited, physically or chemically, onto the support, e.g., being affixed to the hydoxyl groups on the support, and no more than that amount, since any excess organomagnesium compound may cause undesirable side reactions. Routine experimentation can be used to determine the optimum amount of organomagnesium compound. For example, the organomagnesium compound can be added to the slurry while stirring the slurry, until the organomagnesium compound is detected in the support solvent. Alternatively, the organomagnesium compound can be added in excess of the amount that is deposited onto the support, in which case any undeposited excess amount can be removed by filtration and washing. The amount of organomagnesium compound (moles) based on the amount of dehydrated silica (grams) should generally range from 0.2 mmol/g to 2 mmol/g.

Optionally, the organomagnesium compound-treated slurry is contacted with an electron donor, such as tetraethylorthosilicate (TEOS) or an organic alcohol R"OH, where R" is a $C_1$–$C_{12}$ alkyl group, or a $C_1$ to $C_8$ alkyl group, or a $C_2$ to $C_4$ alkyl group. In a particular embodiment, R"OH is n-butanol. The amount of alcohol used in an amount effective to provide an R"OH:Mg mol/mol ratio of from 0.2 to 1.5, or from 0.4 to 1.2, or from 0.6 to 1.1, or from 0.9 to 1.0.

The non-metallocene transition metal compound is then contacted with the organomagnesium slurry to provide the supported bimetallic catalyst. The amount of non-metallocene transition metal compound used is sufficient to give a transition metal to magnesium mol/mol ratio of from 0.3 to 1.5, or from 0.5 to 0.8. The solvent can then be removed in a conventional manner, such as by evaporation or filtering, to obtain the dry, supported first catalyst component, e.g., a non-metallocene transition metal catalyst.

The support slurry can be heated both during and after mixing of the support particles with the non-polar hydrocarbon solvent, but at the point when either or both of the catalysts are combined with the support slurry, the temperature of the slurry should be sufficiently low so that neither of the catalysts are inadvertently activated. Thus, the temperature of the support slurry (e.g., silica slurry) is preferably maintained at a temperature below 90° C., e.g., from 25 to 70° C., or even more narrowly from 40 to 60° C.

Polymerization Process

As indicated elsewhere herein, the bimetallic catalysts described herein are preferably used to make bimodal polyolefin compositions, i.e., a composition having a bimodal molecular weight distribution. Once the supported bimetallic catalyst composition is prepared, as described above, a variety of processes can be carried out using that composition. Among the varying approaches that can be used include procedures set forth in U.S. Pat. No. 5,525,678, incorporated herein by reference, in which those processes are modified to utilize the bimetallic catalyst compositions described herein. The equipment, process conditions, reactants, additives and other materials will of course vary in a given process, depending on the desired composition and properties of the polymer being formed. For example, the processes discussed in any of the following patents can be used, each of which is incorporated by reference: U.S. Pat. Nos. 6,420,580; 6,388,115; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735; and 6,147,173.

The catalysts and catalyst systems described above, e.g., bimetallic catalyst compositions, can be used in a variety of polymerization processes, over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In certain embodiments, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexane-1, octane-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the bimetallic catalyst compositions that include bridged bulky ligand metallocene-type catalysts having a fluoride (F) or a fluorine containing leaving group as described in U.S. Pat. Nos. 5,296,434 and 5,278,264, both of which are herein incorporated by reference.

Typically in a gas phase polymerization process, a continuous cycle is employed where in one part of the cycle of a reactor system, the heat of polymerization heats a cycling gas stream, otherwise known as a recycle stream or fluidizing medium, in the reactor. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 80° C. to about 105° C.

In a typical continuous gas fluidized bed polymerization process for the production of polymer from monomer, a gaseous stream comprising monomer is passed through a fluidized bed reactor in the presence of a catalyst under reactive conditions. A polymer product is withdrawn. Also withdrawn is a cycle gas stream, which is continuously circulated and usually cooled, and together with additional monomer sufficient to replace the monomer polymerized is returned to the reactor. In one embodiment the cycle gas stream is cooled to form a gas and a liquid phase mixture that is then introduced into the reactor. For a detailed description of a gas phase process see U.S. Pat. Nos. 4,543,399 and 4,588,790 herein fully incorporated by reference.

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A particle form polymerization, i.e., a type of slurry process, can be used wherein the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

A solution process can also be used. Examples of solution processes are described in U.S. Pat. Nos. 4,271,060, 5,001, 205, 5,236,998 and 5,589,555, which are fully incorporated herein by reference In an embodiment of the invention, a slurry or gas phase process is used in the presence of a bulky ligand metallocene-type catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. Such a process is described in PCT publication WO 96/08520 and U.S. Pat. Nos. 5,712,352 and 5,763,543, which are herein fully incorporated by reference. In another specific embodiment, the process is operated by introducing a carboxylate metal salt into the reactor and/or contacting a carboxylate metal salt with the bulky ligand metallocene-type catalyst system of the invention prior to its introduction into the reactor, as described in U.S. application Ser. No. 09/113,216 filed Jul. 10, 1998, which is incorporated herein by reference.

Bimodal Polymer Product

The polymers produced by the processes described herein, utilizing the bimetallic catalysts described herein, are preferably bimodal. The term "bimodal," when used to describe a polymer or polymer composition, e.g., polyolefins such as polypropylene or polyethylene, or other homopolymers, copolymers or terpolymers, means "bimodal molecular weight distribution," which term is understood as having the broadest definition persons in the pertinent art have given that term as reflected in printed publications and issued patents. For example, a single composition that includes polyolefins with at least one identifiable high molecular weight distribution and polyolefins with at least one identifiable low molecular weight distribution is considered to be a "bimodal" polyolefin, as that term is used herein. Preferably, other than having different molecular weights, the high molecular weight polyolefin and the low molecular weight polyolefin are essentially the same type of polymer, e.g., polypropylene or polyethylene.

The bimodal polymer products prepared using the bimetallic catalysts described herein can be used in a wide variety of products and end-use applications. The polymers produced by the process of the invention include linear low density polyethylene, elastomers, plastomers, high density polyethylenes, low density polyethylenes, medium density polyethylenes, polypropylene and polypropylene copolymers.

Polymers that can be made using the described processes can have a variety of compositions, characteristics and properties. At least one of the advantages of the bimetallic catalysts is that the process utilized can be tailored to form a polymer composition with a desired set of properties. For example, it is contemplated that the polymers having the same properties as the bimodal polymer compositions in U.S. Pat. No. 5,525,678 can be formed. Accordingly, U.S. Pat. No. 5,525,678 is incorporated herein by reference. Also, the bimetallic catalysts described herein can be used in polymerization processes to form polymers having the same properties as the polymers in the following patents, which are incorporated by reference. U.S. Pat. Nos. 6,420,580; 6,388,115; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735; and 6,147,173.

The polymers, typically ethylene based polymers, should have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.955 g/cc, yet even more preferably in the range from 0.910 g/cc to 0.955 g/cc, and most preferably greater than 0.915 g/cc, preferably greater than 0.920 g/cc, and most preferably greater than 0.925 g/cc.

The polymers can have a molecular weight distribution, a weight average molecular weight to number average molecular weight ($M_w/M_n$) of greater than 5 to about 80, particularly greater than 10 to about 60, more preferably greater than about 15 to less than about 55, and most preferably from 20 to 50.

The polymers made by the described processes can in certain embodiments have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.02 dg/min to about 50 dg/min, and most preferably from about 0.03 dg/min to about 0.1 dg/min.

Polymers made by the described processes can in certain embodiments have a melt index ratio ($I_{21}/I_2$) ($I_{21}$ is measured by ASTM-D-1238-F) of from 40 to less than 500, more preferably from about 60 to less than 200.

Expressed differently, polymers made by the described processes can in certain embodiments have a melt index ratio ($I_{21}/I_2$) ($I_{21}$ is measured by ASTM-D-1238-F) of from preferably greater than 40, more preferably greater than 50, even more preferably greater that 60, still even more preferably greater than 65 and most preferably greater than 70. In one or more other embodiments, the polymer of the invention may have a narrow molecular weight distribution and a broad composition distribution or vice-versa, and may be those polymers described in U.S. Pat. No. 5,798,427 incorporated herein by reference.

In certain embodiments, propylene based polymers can be produced using the processes described herein. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene-type catalysis, elastomers, plastomers, high pressure low density polyethylene, high density polyethylenes, polypropylenes and the like.

Polymers produced by the process of the invention and blends thereof are useful in such forming operations as film, sheet, pipe and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

Embodiments of the present invention will be further described in the following, non-limiting examples. In each of the examples below, a chromium catalyst system was transitioned to a bimetallic system having a non-metallocene portion and a metallocene portion. The chromium catalyst system was prepared according to embodiments described above.

In examples 1–5, the non-metallocene portion was the reaction product of dibutyl magnesium, butanol, and $TiCl_4$.

In examples 1–3, the metallocene portion was bis-n-butyl-cyclopentadienyl zirconium dichloride activated by methylaluminoxane. In examples 4–5, the metallocene portion was bis-n-butyl-cyclopentadienyl zirconium difluoride activated by methylaluminoxane.

In examples 1–3, the bimetallic catalyst system was supported on an activated Davison Sylpol 955 silica support activated at 830° C. In examples 4–5, the bimetallic catalyst system was supported on the same type of silica support activated at 875° C.

In each example, the non-metallocene portion was combined with the dehydrated silica. Anhydrous hexane was used to make a silica/hexane slurry. Dibutyl magnesium was then added to the slurry. Butanol was diluted to volume with hexane and added to the slurry. Titanium tetrachloride was diluted to volume with hexane and the diluted titanium tetrachloride solution was then added to the slurry. The slurry was then allowed to cool to ambient temperature to form the non-metallocene supported catalyst.

The metallocene portion was then added to the above slurry. First, methylaluminoxane (MAO) was added to toluene. For Examples 1–3, the metallocene bis-n-butyl-cyclopentadienyl zirconium dichloride was then added into the MAO solution and the mixture was stirred until all of the solids were dissolved. For Examples 4–5, the metallocene bis-n-butyl-cyclopentadienyl zirconium difluoride was added into the MAO solution, and the mixture was stirred until all of the solids had been dissolved. Next, the MAO/Metallocene mixture was added to the previously prepared non-metallocene slurry to form the bimetallic catalyst.

The polymerization process was conducted in a single, continuous gas phase fluidized bed reactor. The catalysts were injected directly into the fluidized bed using purified nitrogen as a carrier. The gaseous feed streams of ethylene and hexene were mixed together and introduced below the reactor bed into a recycle gas line. The individual flow rates of ethylene and hexene were controlled to maintain fixed composition targets. The ethylene concentration was controlled to maintain a constant ethylene partial pressure. The concentration of all the gases were measured by an online gas chromatograph to ensure relatively constant composition in the recycle gas stream. Except for Example 2 below, hydrogen was also mixed with the feed stream and controlled to maintain a constant hydrogen to ethylene mole ratio.

The fluidized bed was maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small steam of humidified nitrogen to deactivate any trace quantities of residual catalyst.

The properties of the polymer was determined by the following test methods.

1. Melt Index: ASTM D-1238-Condition E.
2. Density: ASTM D-105.
3. Bulk Density: The resin is poured via a ⅞ inch diameter funnel into a fixed volume cylinder of 400 cc. The bulk density is measured as the weight of resin divided by 400 cc to give a value in g/cc.
4. Average Particle Size (APS): The average particle size (APS) is measured by determining the weight of material collected on a series of U.S. Standard sieves and determining the weight average particle size based on the sieve series used.
5. Fines: The fines are defined as the percentage of the total distribution passing through a 120 mesh standard sieve. This has a particle size equivalent of 120 microns. Fines are important since high levels can lead to sheeting and fouling of the reaction cycle gas system. This results in heat exchanger distributor plate fouling requiring a reactor shut down to clean out.

EXAMPLE 1

The chromium catalyst system was a reaction product of a bis-triarylsilyl chromate and hydrocarbylaluminum compound having an aluminum to chromium ratio of 3 to 1 (Al/Cr ratio of 3:1). The chromium catalyst system was fed to a gas phase fluidized bed reactor to form polyethylene at the following conditions:

Bed temperature: 90° C.;

Total reactor pressure of 350 psig;

Bed weight: 150 lb;

Ethylene partial pressure: 220 psia;

Hexene/ethylene molar ratio: 0.0045; and

Hydrogen/ethylene molar ratio: 0.05.

The reactor was then transitioned from the chromium catalyst system to the bimetallic catalyst system. The transition was started by terminating the feed of the chromium catalyst system and introducing water to the reactor at a rate of 4 cc/hr (15 ppmw) for 15 minutes to terminate the polymerization. The introduction of water quenched the reaction instantly, as indicated by an energy balance showing no exothermic energy release from the reactor. The water feed was stopped and the reactor was purged until the reactor was hydrocarbon free. Upon measurement by a moisture analyzer, it was determined that essentially no water was present in the reactor.

Next, about 200 ppmw of 2.5 wt % TMA was injected into the reactor. This TMA entered the reactor quickly, taking less than 10 minutes. Upon introduction of the TMA into the reactor, static activity (about 400 V) and cold temperatures near the reactor wall (wall temperatures up to 15° C. below the reactor temperature) were observed, showing some sort of chemical reaction between the chromium catalyst and the TMA. The reactor was circulated for 30 minutes and then the reactor was depressurized and purged with nitrogen before reaction conditions were built.

After the blowdown and nitrogen purge was complete, 100 ppmw of 2.5 wt % TMA was added to the reactor. Reaction conditions were then initiated. The reaction conditions were 95° C. at 300 psig, an ethylene partial pressure of 160 psia, a hydrogen/ethylene molar ratio of 0.011, a hexene/ethylene molar ratio of 0.012, and a bed weight of 115 lb. An additional 100 cc/hr of 2.5 wt % TMA and 0.2 cc/hr of water was fed throughout condition build, which took about one hour.

The bimetallic catalyst system was then introduced at a rate of 13 cc/hr, which resulted in a strong reaction very quickly. After less than 8 hours, the reactor was shut down due to sheeting. It was determined that the catalyst feed rate was higher than desired. Also, static and cold wall temperatures that occurred after the TMA was added quickly suggested that this step put the reactor into a condition that was more prone to sheeting.

EXAMPLE 2

The chromium catalyst was a bis-triarylsilyl chromate and hydrocarbylaluminum catalyst system having an aluminum to chromium ratio of 3 to 1 (Al/Cr ratio of 3:1). The chromium catalyst system was fed to a gas phase fluidized bed reactor to form polyethylene at the following conditions:

Bed temperature: 90° C.;

Total reactor pressure of 350 psig;

Bed weight: 175 lb;

Ethylene partial pressure: 225 psia; and

Hexene/ethylene molar ratio: 0.004.

No hydrogen was added. The reactor was then transitioned from the chromium catalyst system to the bimetallic catalyst system. The transition was started by terminating the feed of the chromium catalyst system and introducing water to the reactor at 2 cc/hr (15 ppmw) for 35 minutes to terminate the polymerization. The water feed was then stopped and the reactor was purged with nitrogen until the reactor was hydrocarbon free. Upon measurement, it was determined that essentially no water remained in the reactor upon termination of the reaction. Additional water was then added at a rate of about 0.5 cc/hr until 10 ppm of water resided in the reactor. Next, 200 ppmw of 2.5 wt % TMA was added and circulated in the bed for 30 minutes. The reactor was then depressurized and purged with nitrogen before reaction conditions were built.

After the blowdown and nitrogen purge was complete, 100 ppmw of 2.5 wt % TMA was added to the reactor. Reaction conditions were then initiated. During condition build, an additional 100 cc/hr of 2.5 wt % TMA and 0.4 cc/hr of water was fed to the reactor, which took about 1 hour. The reaction conditions were 95° C. at 300 psig, an ethylene partial pressure of 130 psia, a hydrogen/ethylene molar ratio of 0.011, a hexene/ethylene molar ratio of 0.012, and a bed weight of 175 lb.

The bimetallic catalyst system was then fed to the reactor at a target rate of 13 cc/hr. Reaction was observed within the first hour. The reaction increased very quickly. Cold bands and static cleared temporarily. After less than one bed turn-over, the thermocouple spiked above bed temperature. The reactor was subsequently shut-down. Visual inspection revealed a large molten sheet along the wall of the reactor. It was determined that the catalyst feedrate was higher than desired. Also, the static and cold wall temperatures that occurred after the TMA was added suggested that this step put the reactor into a condition that was more prone to sheeting.

EXAMPLE 3

The chromium catalyst was a bis-triarylsilyl chromate and hydrocarbylaluminum catalyst system having an aluminum to chromium ratio of 5 to 1 (Al/Cr ratio of 5:1). The chromium catalyst system was fed to a gas phase fluidized bed reactor to form polyethylene at the following conditions:

Bed temperature: 92° C.;

Total reactor pressure of 350 psig;

Bed weight: 190 lb;

Ethylene partial pressure: 250 psia;

Hexene/ethylene molar ratio: 0.0025; and

Hydrogen/ethylene molar ratio: 0.0063.

The reactor was then transitioned from the chromium catalyst system to the bimetallic catalyst system. The transition was started by terminating the feed of the chromium catalyst system and introducing water to the reactor at 2 cc/hr (15 ppmw) for 15 minutes to terminate the polymerization. The introduction of water quenched the reaction instantly, as indicated by an energy balance showing no exothermic energy release from the reactor. The water feed was stopped and the reactor was purged with nitrogen until the reactor was hydrocarbon free. Upon measurement by a moisture analyzer, it was determined that essentially no water was present in the reactor.

Next, 1.5 wt. % TMA was fed at a rate of 425 cc/hr and water was fed at a rate of 0.15 cc/hr over a four hour period. The reactor was circulated for 30 minutes and then depressurized and purged with nitrogen before building reaction conditions.

During condition build, additional 1.5 wt % TMA was fed at 167 cc/hr and water was fed at 0.5 cc/hr to obtain a water concentration within the reactor of 10 ppm. Once reaction conditions were built, the bimetallic catalyst system was fed to the reactor at a target rate of 2.2 cc/hr. The reaction conditions were 95° C. at 300 psig, an ethylene partial pressure of 130 psia, a hydrogen/ethylene molar ratio of 0.011, a hexene/ethylene molar ratio of 0.012, and a bed weight of 175 lb.

This startup was successful. The resin produced from the transitioned bimetallic catalyst system exhibited desirable properties as shown in Table 1. Static activity was minimal (about 200V) during the TMA addition. Further, steady state was achieved with reasonable catalyst productivity, and no sheeting and unexpected thermocouple activity was observed.

TABLE 1

Resin properties of Example 3:

|  | Before Transition (chromium catalyst) | After Transition (bimetallic catalyst) |
| --- | --- | --- |
| $I_{21}$ | 5.5 dg/min | 9.5 dg/min |
| $I_2$ |  | 0.072 dg/min |
| Bulk density | 0.953 g/cc | 0.9950 g/cc |
| APS | 0.027 in. | 0.032 in. |
| Fines | 0.59 wt % | 1.8 wt %. |

EXAMPLE 4

This example was an intentional repeat of Example 3. This startup was also successful. The resin produced from the transitioned bimetallic catalyst system exhibited desirable properties as shown in Table 2. Static activity was minimal (about 200V) during the TMA addition. Further, steady state was achieved with reasonable catalyst productivity, and no sheeting and unexpected thermocouple activity was observed.

TABLE 2

Resin properties of Example 4:

|  | Before Transition (chromium catalyst) | After Transition (bimetallic catalyst) |
| --- | --- | --- |
| $I_{21}$ | 4.1 dg/min | 8.3 dg/min |
| $I_2$ |  | 0.061 dg/min |
| Bulk density | 0.953 g/cc | 0.944 g/cc |
| APS | 0.027 in. | 0.035 in. |
| Fines | 0.97 wt % | 0.65 wt % |

EXAMPLE 5

The chromium catalyst was a bis-triarylsilyl chromate and hydrocarbylaluminum catalyst system having an aluminum to chromium ratio of 5 to 1 (Al/Cr ratio of 5:1). The chromium catalyst system was fed to a gas phase fluidized bed reactor to form polyethylene at the following conditions:

Bed temperature: 98° C.;

Total reactor pressure of 300 psig;

Bed weight: 150 lb;

Ethylene partial pressure: 250 psia;

Hexene/ethylene molar ratio: 0.003; and

Hydrogen/ethylene molar ratio: 0.0063.

The reactor was then transitioned from the chromium catalyst system to the bimetallic catalyst system. The transition was started by terminating the feed of the chromium catalyst system and introducing water to the reactor at 2 cc/hr for 35 minutes to terminate the polymerization. Next, 1.5 wt. % TMA was fed at a rate of 425 cc/hr and water was fed at a rate of 0.15 cc/hr over a four hour period. The reactor was circulated for 30 minutes and purged until 10 ppm water remained in the reactor.

During condition build, 1.5 wt % TMA was fed at 170 cc/hr and water was fed at 0.35 cc/hr. Once reaction conditions were built, the bimetallic catalyst system was fed to the reactor at a target rate of 2.2 cc/hr. The reaction conditions were 95° C. at 300 psig, an ethylene partial pressure of 130 psia, a hydrogen/ethylene molar ratio of 0.007, a hexene/ethylene molar ratio of 0.012, and a bed weight of 175 lb.

This startup was successful. The resin produced from the transitioned bimetallic catalyst system exhibited desirable properties as shown in Table 3. Static activity was minimal (about 200V) during the TMA addition. Further, steady state was achieved with reasonable catalyst productivity, and no sheeting and unexpected thermocouple activity was observed.

TABLE 3

Resin properties of Example 5:

| | Before Transition (chromium catalyst) | After Transition (bimetallic catalyst) |
|---|---|---|
| $I_{21}$ | 10.4 dg/min | 9.4 dg/min |
| $I_2$ | | 0.073 dg/min |
| Bulk density | 0.953 g/cc | 0.949 g/cc |
| APS | 0.03 in. | 0.031 in. |
| Fines | 0.8 wt % | 1.2 wt % |

What is claimed is:

1. A polymerization process, comprising:
    providing a polymerization reactor that includes a first catalyst system;
    contacting olefin monomers with the first catalyst system to form polyolefin in a first polymerization reaction;
    introducing a catalyst killer to the polymerization reactor in an amount sufficient to terminate the first polymerization reaction;
    introducing a second catalyst system to the polymerization reactor in the presence of at least a portion of the catalyst killer, wherein the at least a portion of the catalyst killer is an amount sufficient to activate the second catalyst system; and
    contacting olefin monomers with the second catalyst system to form polyolefin in a second polymerization reaction.

2. The process of claim 1, wherein the catalyst killer comprises water.

3. The process of claim 1, wherein the first catalyst system comprises one or more chromium catalysts.

4. The process of claim 1, wherein the second catalyst system comprises a Ziegler-Natta catalyst system, a metallocene catalyst system, a bimetallic catalyst system, a multi-catalyst system, or any combination thereof.

5. The process of claim 1, wherein the second catalyst system is a bimetallic catalyst system comprising a non-metallocene catalyst component and a metallocene catalyst component.

6. The process of claim 1, wherein the amount sufficient to terminate the first polymerization reaction is greater than the amount sufficient to activate the second catalyst system.

7. The process of claim 1, wherein the amount sufficient to terminate the first polymerization reaction is at least 30 percent more than the amount sufficient to activate the second catalyst system.

8. The process of claim 1, further comprising introducing an activator compound to the polymerization reactor prior to introducing the second catalyst system to the polymerization reactor.

9. The process of claim 1, further comprising introducing an activator compound to the polymerization reactor prior to introducing the second catalyst system to the polymerization reactor, wherein the activator compound is an aluminum alkyl compound.

10. The process of claim 1, further comprising introducing an activator compound to the polymerization reactor prior to introducing the second catalyst system to the polymerization reactor, wherein the activator compound is selected from the group consisting of trimethylaluminum, triethylaluminum, triisobutylaluminum and diethylaluminum chloride.

11. A process of introducing a bimetallic catalyst system to a polymerization reactor, comprising:
    introducing water into the polymerization reactor at a rate sufficient to provide a first water concentration, the first water concentration being sufficient to terminate a polymerization reaction catalyzed by a first catalyst system;
    adjusting the first water concentration to a second water concentration, the second water concentration being an amount sufficient to activate the bimetallic catalyst system; and
    introducing the bimetallic catalyst system to the polymerization reactor.

12. The process of claim 11, wherein the bimetallic catalyst system comprises at least one non-metallocene catalyst component and at least one metallocene catalyst component.

13. The process of claim 11, wherein the bimetallic compound comprises a fluorinated catalyst.

14. The process of claim 11, wherein the first catalyst system comprises one or more chromium catalysts.

15. The process of claim 11, wherein adjusting the first water concentration to a second water concentration comprises reducing the first water concentration of 15 ppm to a second water concentration of 10 ppm using an alkyl aluminum scavenger.

16. The process of claim 11, wherein adjusting the first water concentration to a second water concentration comprises reducing the first water concentration by at least 30 percent.

17. The process of claim 11, wherein the water amount sufficient to activate a bimetallic catalyst system is at least 10 ppm.

18. The process of claim 11, further comprising introducing an organometallic compound to the polymerization reactor in an amount sufficient to activate at least a portion of the bimetallic catalyst system.

19. The process of claim 11, further comprising introducing trimethylaluminum to the polymerization reactor in an amount sufficient to activate at least a portion of the bimetallic catalyst system.

20. A process of transitioning a first catalyst system to a second catalyst system within a gas phase polymerization reactor, comprising:
contacting one or more olefin monomers with the first catalyst system to polymerize the one or more olefin monomers and form polyolefin;
introducing water into the gas phase polymerization reactor to create a water concentration sufficient to terminate the first catalyst system;
introducing an organometallic compound to the polymerization reactor in the presence of the water, the water having a concentration sufficient to activate at least a portion of the second catalyst compound; and then
introducing the second catalyst system to the gas phase polymerization reactor.

21. The process of claim 20, wherein the water concentration sufficient to terminate the first catalyst system is at least 15 ppm.

22. The process of claim 20, further comprising reducing the water concentration to a level sufficient to activate the second catalyst system.

23. The process of claim 22, wherein the water concentration sufficient to activate the second catalyst system is at least 5 ppm.

24. The process of claim 22, wherein the water concentration sufficient to terminate the first catalyst system is at least 30 percent more than the concentration sufficient to activate the second catalyst system.

25. The process of claim 20, wherein the first catalyst system comprises one or more chromium catalysts.

26. The process of claim 20, wherein the second catalyst system comprises a Ziegler-Natta catalyst system, a metallocene catalyst system, a bimetallic catalyst system, a multi-catalyst system, or any combination thereof.

27. The process of claim 20, wherein the second catalyst system is a bimetallic catalyst system.

28. The process of claim 20, wherein the bimetallic catalyst system comprises at least one non-metallocene catalyst component and at least one metallocene catalyst component.

29. The process of claim 20, wherein the bimetallic compound comprises a fluorinated metallocene catalyst component.

30. The process of claim 20, wherein the organometallic compound comprises trimethylaluminum.

* * * * *